US008184278B2

(12) United States Patent
Feng et al.

(10) Patent No.: US 8,184,278 B2
(45) Date of Patent: May 22, 2012

(54) OPTICAL SENSING DEVICE WITH ROTATING TYPE SHADING ASSEMBLY

(75) Inventors: Chung-Ping Feng, Hsinchu County (TW); Peng-Yu Chen, Taipei (TW)

(73) Assignee: Edison Opto Corporation, Taipei Hsien (TW)

( * ) Notice: Subject to any disclaimer, the term of this patent is extended or adjusted under 35 U.S.C. 154(b) by 134 days.

(21) Appl. No.: 12/835,213

(22) Filed: Jul. 13, 2010

(65) Prior Publication Data

US 2011/0216310 A1 Sep. 8, 2011

(30) Foreign Application Priority Data

Mar. 5, 2010 (TW) .............................. 99106391 A (51) Int. Cl.
G01N 33/48 (2006.01)
(52) U.S. Cl. .................................................... 356/139.1
(58) Field of Classification Search ............... 356/139.1; 250/216
See application file for complete search history.

(56) References Cited

U.S. PATENT DOCUMENTS

| 2,896,145 | A | * | 7/1959 | Snodgrass ..................... 318/584 |
| 3,717,036 | A | * | 2/1973 | LaCoste ....................... 73/382 R |
| 3,890,606 | A | * | 6/1975 | Florian et al. ................. 367/183 |
| 4,115,006 | A | * | 9/1978 | Reymond et al. ........... 356/139.1 |
| 4,168,908 | A | * | 9/1979 | Cubalchini .............. 356/139.08 |
| 4,290,043 | A | * | 9/1981 | Kaplan .......................... 340/984 |
| 4,376,390 | A | * | 3/1983 | Rines ........................ 73/514.02 |
| 4,419,692 | A | * | 12/1983 | Modisette et al. ............. 348/167 |
| 4,422,758 | A | * | 12/1983 | Godfrey et al. ............ 356/152.1 |
| RE32,967 | E | * | 6/1989 | St. John et al. ............. 242/534.1 |
| 4,865,309 | A | * | 9/1989 | Beasock et al. ................ 271/227 |
| 4,995,025 | A | * | 2/1991 | Schulze ........................ 369/222 |
| 5,159,202 | A | * | 10/1992 | Ametani ................... 250/559.22 |
| 5,438,404 | A | * | 8/1995 | Hamilton et al. .......... 356/152.2 |
| 5,611,731 | A | * | 3/1997 | Bouton et al. ................... 463/37 |
| 5,684,244 | A | * | 11/1997 | Jones .............................. 73/1.77 |
| 6,328,002 | B1 | * | 12/2001 | Spletzer et al. ............. 123/46 H |
| 6,538,750 | B1 | * | 3/2003 | Fishbaine et al. ............. 356/614 |
| 7,190,444 | B1 | * | 3/2007 | Cohen ........................... 356/138 |
| 7,534,298 | B2 | * | 5/2009 | Shanmugasundram et al. ............................. 118/320 |
| 2005/0088647 | A1 | * | 4/2005 | Shanmugasundram et al. .............................. 356/72 |
| 2005/0134440 | A1 | * | 6/2005 | Breed ............................ 340/435 |
| 2008/0094631 | A1 | * | 4/2008 | Jung et al. ..................... 356/419 |
| 2011/0138909 | A1 | * | 6/2011 | Van Kann .................... 73/382 G |
| 2011/0272562 | A1 | * | 11/2011 | Chen et al. ..................... 250/216 |

* cited by examiner

*Primary Examiner* — Thomas H. Tarcza
*Assistant Examiner* — Antoine J Bedard
(74) *Attorney, Agent, or Firm* — Rosenberg, Klein & Lee (57) ABSTRACT

An optical sensing device includes a shell, at least one light emitting member, a rotating type shading assembly and at least one optical sensing member. The shell is formed with a black-body condition space having a light emitting chamber, a shading chamber and at least one optical sensing chamber. The light emitting member projects a light beam. The rotating type shading assembly includes a pivot and a shading member. The shading member is pivotally connected to the pivot in the shading chamber, and has a weight center offset from the pivot center. When the optical sensing device is tilted, the shading member is rotated to make the weight center located in a lowering azimuth with respect to the pivot. The optical sensing member is arranged in the optical sensing chamber, and senses the light beam to accordingly send out a sensing signal.

7 Claims, 7 Drawing Sheets

OPTICAL SENSING DEVICE WITH ROTATING TYPE SHADING ASSEMBLY

This application claims the benefit of Taiwan Patent Application Serial No. 099106391, filed Mar. 5, 2010, the subject matter of which is incorporated herein by reference.

FIELD OF THE INVENTION

The present invention relates to an optical sensing device, and more particularly to an optical sensing device having a rotating type shading assembly.

BACKGROUND OF THE INVENTION

In daily life, it is usually necessary to use some sensors to obtain the inclined angle or the movement data of an object. These sensors usually can provide the functions of sensing horizontal movement, vertical movement or inclined angle. Practically, many sensing technologies, such as optical sensing technologies, sound wave sensing technologies, or electrical sensing technologies, may be applied to these sensors. Among these sensing technologies, the optical sensing technologies have the advantage of rapid sensing, so that the optical sensing technologies are widely applied to manufacture some optical sensing devices with high sensing sensitivity.

Among the present optical sensing devices, most of them are provided with a shell having a black-body condition space therein. In the black-body condition space, a light emitting member, a shading member and at least one optical sensing member are arranged, so as to make sure that the optical sensing can exactly execute the function of optical sensing without being interfered by the light pollution generated from the outer environment.

In the optical sensing device, the light emitting member projects a light beam. The shading member is a movable type shading member movably arranged within the black-body condition space, so as to move by the action of gravity or inertial force when the optical sensing device is moved or tilted, and further to accordingly change the relative position of the shading member with respect to the light emitting member and the optical sensing member.

When the relative position of the shading member with respect to the light emitting member and the optical sensing member is changed, the reflection angle and the path of the light beam are also be changed to make the intensity of the light beam, that the optical sensing member senses, is changed together with above changes, so as to accordingly judge or calculate the parameters of horizontal movement, vertical movement, and the inclination angle, etc.

However, in above conventional optical sensing technology, it is unavoidable that exists a problem that the noise is generated when the shading member moves in the shading chamber to impact the inner wall of the shading chamber. Under the influence of the noise, it also makes the user be confused with the problem that whether the noise is caused by normal impact or caused by abnormal looseness of inner components, and further brings more troubles in maintenance.

SUMMARY OF THE INVENTION

Due to that there is a serious problem that the noise brings more troubles in maintenance in the prior arts, the primary objective of the present invention is to provide an optical sensing device, in which a rotating type shading assembly is arranged in the shading chamber to replace the conventional movable type shading member, so as to make the rotating type shading assembly rotate to the azimuth according to the variation caused by gravity action when the optical sensing device is inclined due to lifting or lowering, and further to sense the inclination azimuth of the optical sensing device.

Means of the present invention for solving the problems as mentioned above provides an optical sensing device, which comprises a shell, at least one light emitting member, a rotating type shading assembly and at least one optical sensing member. The shell is formed with a black-body condition space having a light emitting chamber, a shading chamber and at least one optical sensing chamber. The light emitting member projects a light beam. The rotating type shading assembly includes a pivot and a shading member. The shading member is pivotally connected to the pivot in the shading chamber, and has a weight center offset from the pivot center. When the optical sensing device is tilted due to any corner or edge thereof being lifted or lowered, the shading member is rotated to make the weight center located in a lowering azimuth with respect to the pivot. The optical sensing member is arranged in the optical sensing chamber, and senses the light beam to accordingly send out a sensing signal.

In the preferred embodiment of the present invention, the optical sensing device further comprises a circuit board, and the shell is assembled with the circuit board to form the black-body condition space therein. An anti-static member is further arranged in the shading chamber to ground a static electricity generated when the shading member rotates in the shading chamber. The light emitting member can be a light emitting diode (LED), and the optical sensing member can be a photo transistor or a photo diode.

Furthermore, in the preferred embodiment of the present invention, the shading member includes a pivotal connection portion and a weight portion. The pivotal connection portion is pivotally connected to the pivot, the weight portion is extended from the pivotal connection portion, and the weight center is located in the weight portion. It is more preferable that the weight, the specific weight, and/or the volume of the weight portion are/is greater than those/that of the pivotal connection portion. Additionally, the pivot can be connected to the shell, the circuit board, or both of them.

Comparing with the optical sensing device as disclosed in prior arts, in the present invention, an rotating type shading assembly is arranged in the shading chamber to replace the conventional movable type shading member; therefore, it is able to sense the inclination azimuth of the optical sensing device via the rotation of the rotating type shading assembly, so as to reduce the generation of the noise caused by that the shading member impacts the inner wall of the shading chamber, and further to prevent the troubles in use or maintenance caused by the noise.

The devices, characteristics, and the preferred embodiments of this invention are described with relative figures as follows.

BRIEF DESCRIPTION OF THE DRAWINGS

The structure and the technical means adopted by the present invention to achieve the above and other objectives can be best understood by referring to the following detailed description of the preferred embodiments and the accompanying drawings, wherein.

DETAILED DESCRIPTION OF THE PREFERRED EMBODIMENTS

The optical sensing device as provided in accordance with the present invention can be widely applied to sense the movement or the inclined angle of many kinds of objects, and the combined applications of the present invention are too numerous to be enumerated and described, so that only three preferred embodiments are disclosed as follows for representation.

Figure 1:
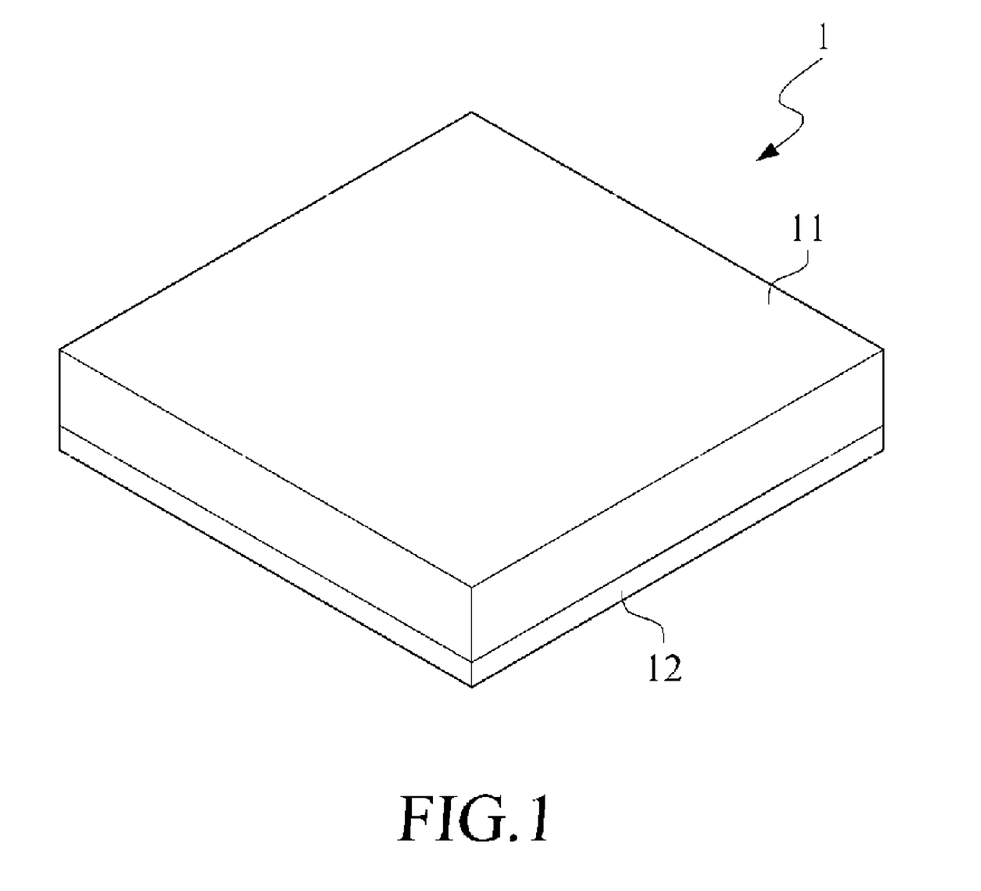
FIG. 1 is a perspective view of an optical sensing device in accordance with a first embodiment of the present invention.
Figure 2:
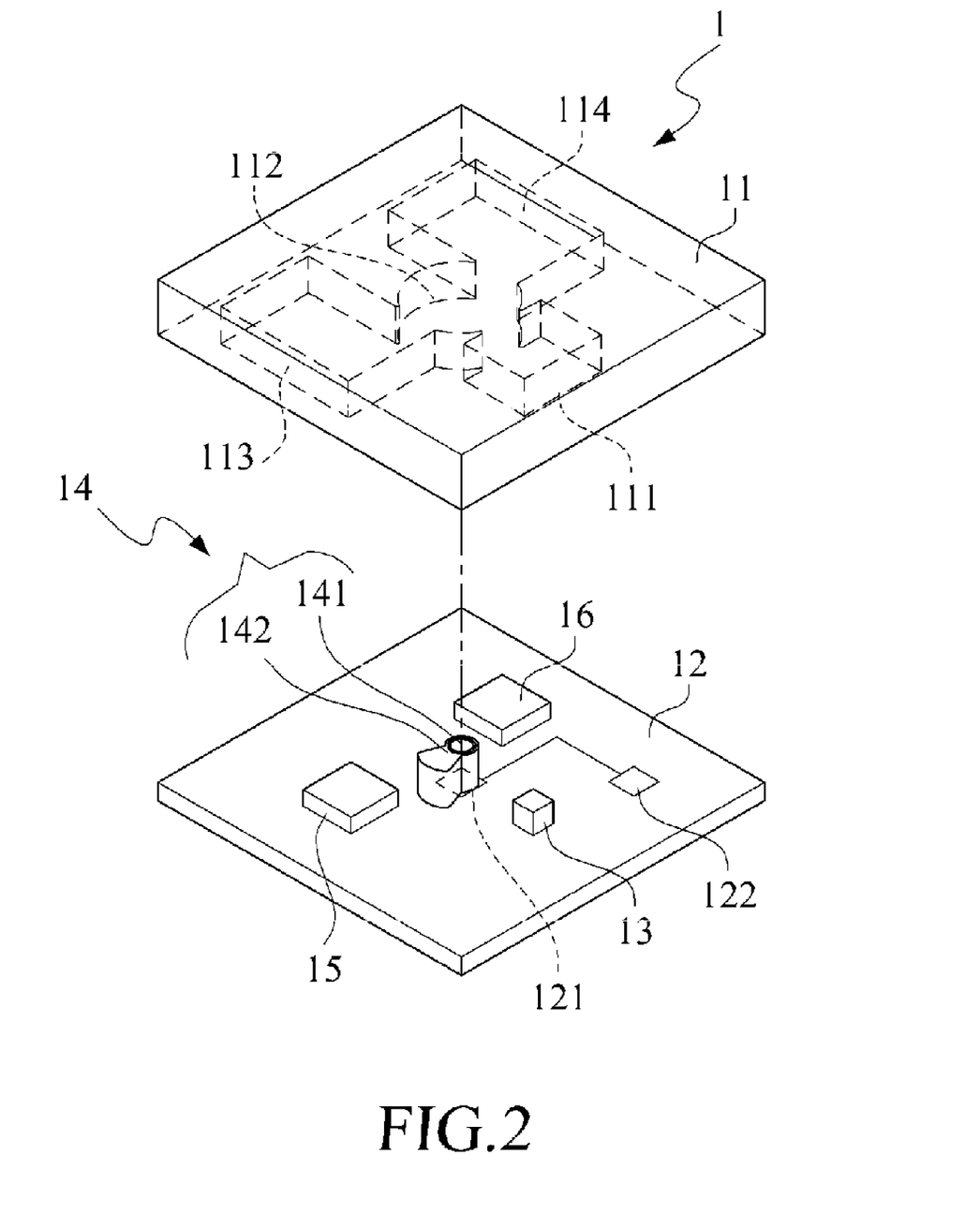
FIG. 2 is a perspective view of the optical sensing device after the shell is apart from the circuit board in accordance with the first embodiment of the present invention.
Figure 3:
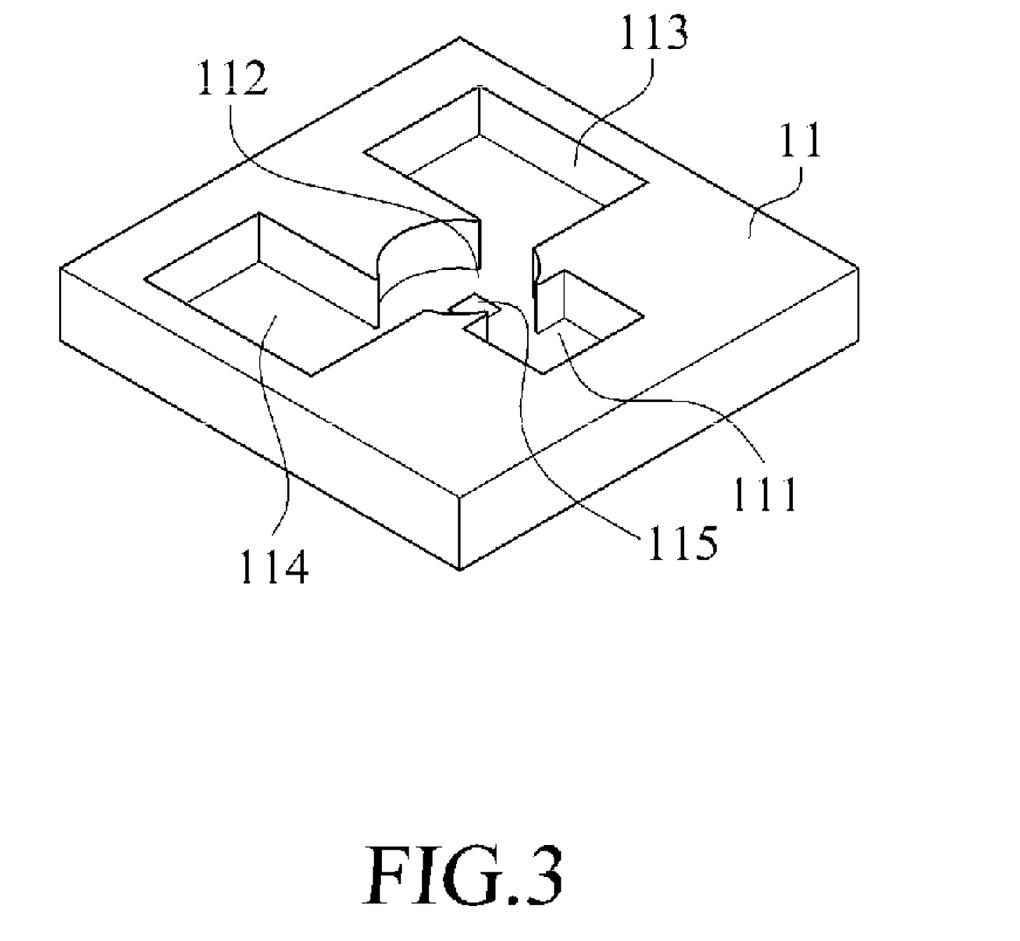
FIG. 3 illustrates the structure of the shell in accordance with the first embodiment of the present invention.
Figure 4:
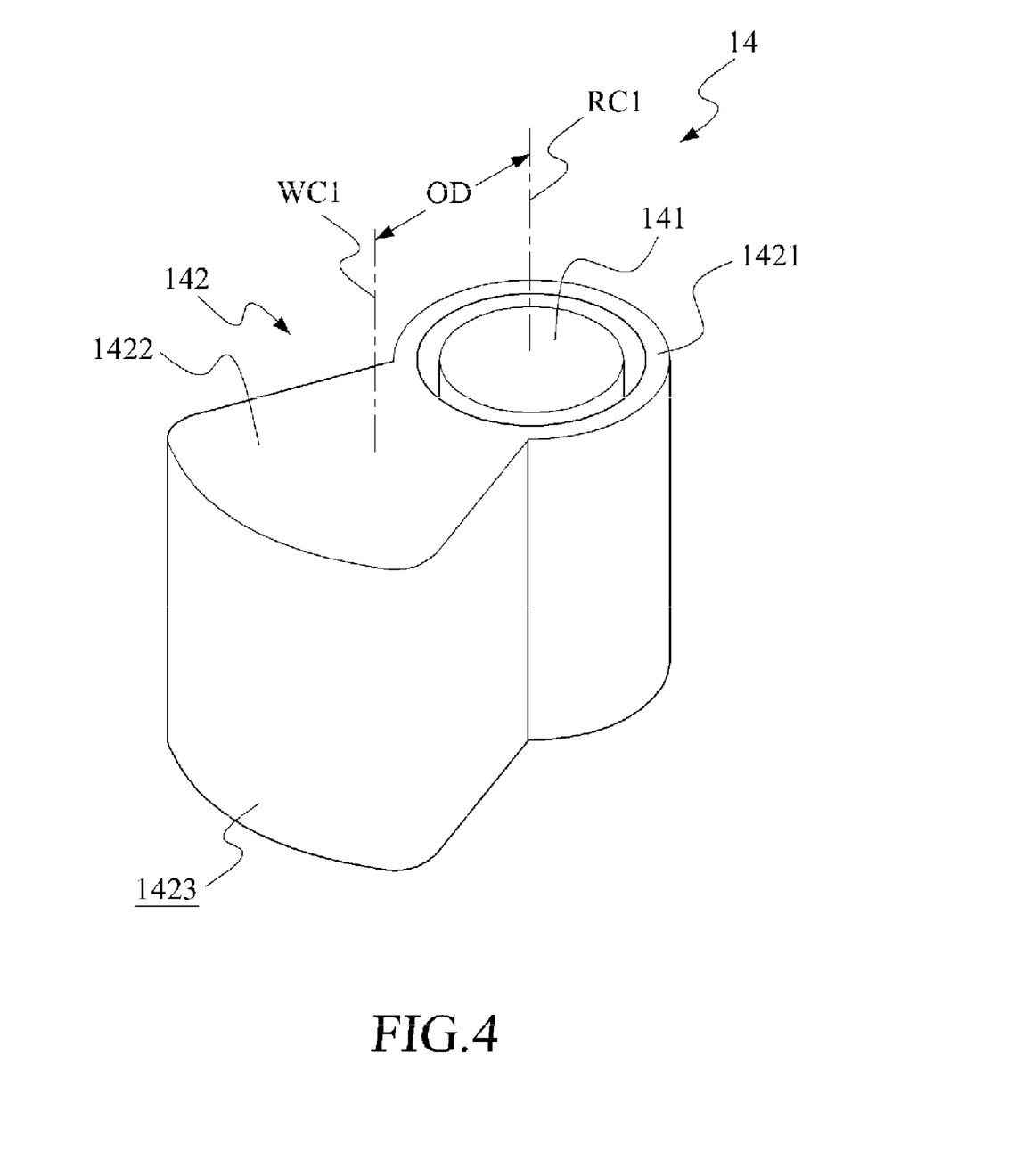
FIG. 4 illustrates the structure of the rotating type shading assembly in accordance with the first embodiment of the present invention.
Figure 5:
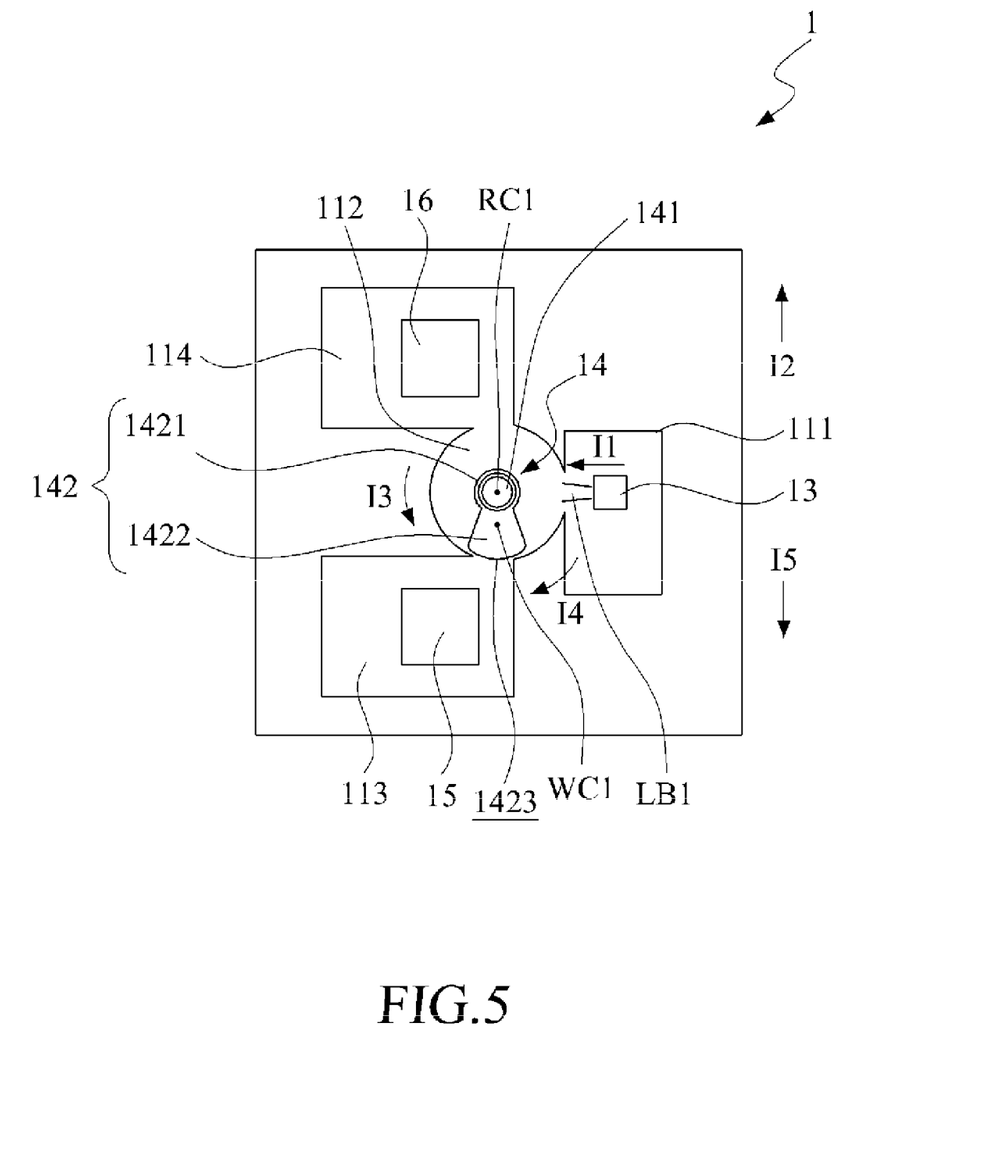
FIG. 5 illustrates the working principle in accordance with the first embodiment of the present invention.

Please refer to FIG. 1 to FIG. 5, wherein FIG. 1 is a perspective view of an optical sensing device in accordance with a first embodiment of the present invention; FIG. 2 is a perspective view of the optical sensing device after the shell is apart from the circuit board in accordance with the first embodiment of the present invention; FIG. 3 illustrates the structure of the shell in accordance with the first embodiment of the present invention; FIG. 4 illustrates the structure of the rotating type shading assembly in accordance with the first embodiment of the present invention; and FIG. 5 illustrates the working principle in accordance with the first embodiment of the present invention.

As shown in FIG. 1 to FIG. 5, an optical sensing device 1 includes a shell 11, a circuit board 12, a light emitting member 13, a rotating type shading assembly 14 and two optical sensing members 15 and 16. The shell 11 and the circuit 12 are assembled with each other to form a black-body condition space therein. The black-body condition space has a light emitting chamber 111, a shading chamber 112, and two optical sensing chambers 113 and 114. The shading chamber 112 is spatially communicated with the light emitting chamber 111, and the optical sensing chambers 113 and 114. An anti-static member 115 is arranged in the shading chamber 112. Furthermore, the anti-static member 115 can be an anti-static coating partially or fully coated on an inner wall of the shading chamber 112.

The circuit board 12 is arranged with another anti-static member 121 and a grounding circuit 122, and the anti-static members 115 and 121 are electrically connected with the grounding circuit 122, so as to keep the anti-static members 115 and 121 in a grounding situation. Meanwhile, the anti-static member 121 is arranged on the circuit board 12 with respect to the shading chamber 112, and can be an anti-static circuit or an anti-static layer. When the anti-static member 115 is an anti-static coating, it can be extended out from the shading chamber 112 to contact with the grounding circuit 122 of the circuit board 12.

The light emitting member 13 is arranged in the light emitting chamber 111, and can be a light emitting diode (LED). A light beam LB1 projected form the light emitting member 13 can be any one of the light beams with different wavelengths, such as the visible light beam, an ultraviolet (UV) light beam, the infrared (IR) light beam, or any other light beam. Preferably, the light beam LB1 can be the infrared (IR) light beam. The rotating type shading assembly 14 includes a pivot 141 and a shading member 142.

Observing From the top view, the shading member 142 can be formed in a sector shaped structure, a plate shaped structure, a water-drop shaped structure, an oval shaped structure, an hourglass shaped structure, or any other regular or irregular shaped structure. The pivot 141 is arranged in the shading chamber 112, and can be a rotation center RC1. The pivot can be connected to the shell 11, the circuit board 12, or both of them. The shading member 142 includes a pivotal connection portion 1421, a weight portion 1422 and a shading surface 1423, and has a weight center WC1 offset from the pivot 141. In other words, the weight center WC1 is offset from the rotation center RC1. From FIG. 4, the shading member 142 is a sector shaped structure, and the weight center WC1 and the rotation center RC1 are distanced from each other in an offset distance OD.

The pivotal connection portion 1421 is pivotally connected to the pivot 141. The weight portion 1422 is extended from the pivotal connection portion 1421, the weight center WC1 is located in the weight portion 1422, and the shading surface 1423 is also located in the weight portion 1422. Preferably, the weight, the specific weight, and/or the volume of the weight portion 1422 are/is greater than those/that of the pivotal connection portion 1421, so as to make the shading member 142 be rotatably restrained in the shading chamber 112. Preferably, after the rotating type assembly 14 being arranged in the shading chamber 112, the shading surface almost fully covers the clearance between the shell 11 and the circuit board 12 in height. More preferably, when the weight portion 1422 approaches to or faces to the optical sensing chambers 113 or 114, the shading surface 1423 almost fully shades the optical sensing chamber 113 or 114 respectively.

When the shading member 142 rotates in the shading chamber 112, it always keeps in contacting with at least one of the anti-static members 115 and 121. The optical sensing members 15 and 16 are respectively arranged in the optical sensing chambers 113 and 114, and either one of them can be a photo transistor or a photo diode. Though that in the first embodiment, it is necessary to electrically connect both the anti-static members 115 and 121 to the grounding circuit 122; in practical applications, it is also unnecessary to provide the anti-static function by electrically connected to the grounding circuit 122 if the anti-static members 115 and 121 themselves have sufficient ability of absorbing or reducing the static electricity.

An object (not shown), which needs to be sensed, can be an electronic device, such as a digital camera, a personal digital assistant (PDA), or a mobile phone. When the optical sensing device 1 is operated to sense the inclination azimuth of the object, it is able to embed the optical sensing device 1 into the object or connect the optical sensing device 1 to the object, and make the light emitting member 13 project a light beam LB1 into the light emitting chamber 111 along a projection direction I1. At this moment, the light beam LB1 projects to the shading member 142 restrained in the shading chamber 112 along the projection direction I1, illuminates the black-body condition space after being reflected from the shading member 142 or the inner wall of the shell 11 for at least one time, and is further sensed by the optical sensing members 15 and 16.

As shown in FIG. 5, when the object is lifted in a lifting azimuth I2, the lifting azimuth I2 of the optical sensing device 1 is lifted to make optical sensing device 1 inclined, and further to make the shading member 142 suffer a gravity action. When the rotation torque, obtained from the product of the component of the gravity force, along the surface that the shading member 142 contacts with the circuit board 12, and the offset distance OD, is greater than the resistance torque provided by the friction between the shading member 142 and the circuit board 12 or between the shading member 142 and the inner wall of the shading chamber 112, the shading member 142 rotates along a rotation direction I3 or another rotation direction I4 to make the weight center WC1 located in a lowering azimuth I5, opposite to the lifting azimuth I2, with respect to the geometric center rotation center RC1 to form a shading condition. Under this shading condition, the first shading surface 1423 located in the weight portion 142 almost fully shades the optical sensing chamber 113, so as to make the optical sensing member 15 located in the optical sensing chamber 113 hardly sense the light beam LB1. On the contrary, the pivotal connection portion just partially shades or does not shade the optical sensing chamber 114, so as to make the optical sensing member 16 located in the optical sensing chamber 114 be capable of sensing larger intensity of the light beam LB1, and to accordingly send out a sensing signal to obtain the inclination azimuth, which can be presented in either the lifting azimuth or the lowering azimuth, of the object.

Similarly, when the object is lowered in a lowering azimuth I5, the lowering azimuth I5 of the optical sensing device 1 is lowered to make optical sensing device 1 inclined, and further to make the shading member 142 suffer the gravity action. When the rotation torque, obtained from the product of the component of the gravity force, along the surface that the shading member 142 contacts with the circuit board 12, and the offset distance OD, is greater than the resistance torque provided by the friction between the shading member 142 and the circuit board 12 or between the shading member 142 and the inner wall of the shading chamber 112, the shading member 142 also rotates along the rotation direction I3 or the other rotation direction I4 to make the weight center WC1 located in the lowering azimuth I5 with respect to the geometric center GC1 to form the shading condition.

Figure 6:
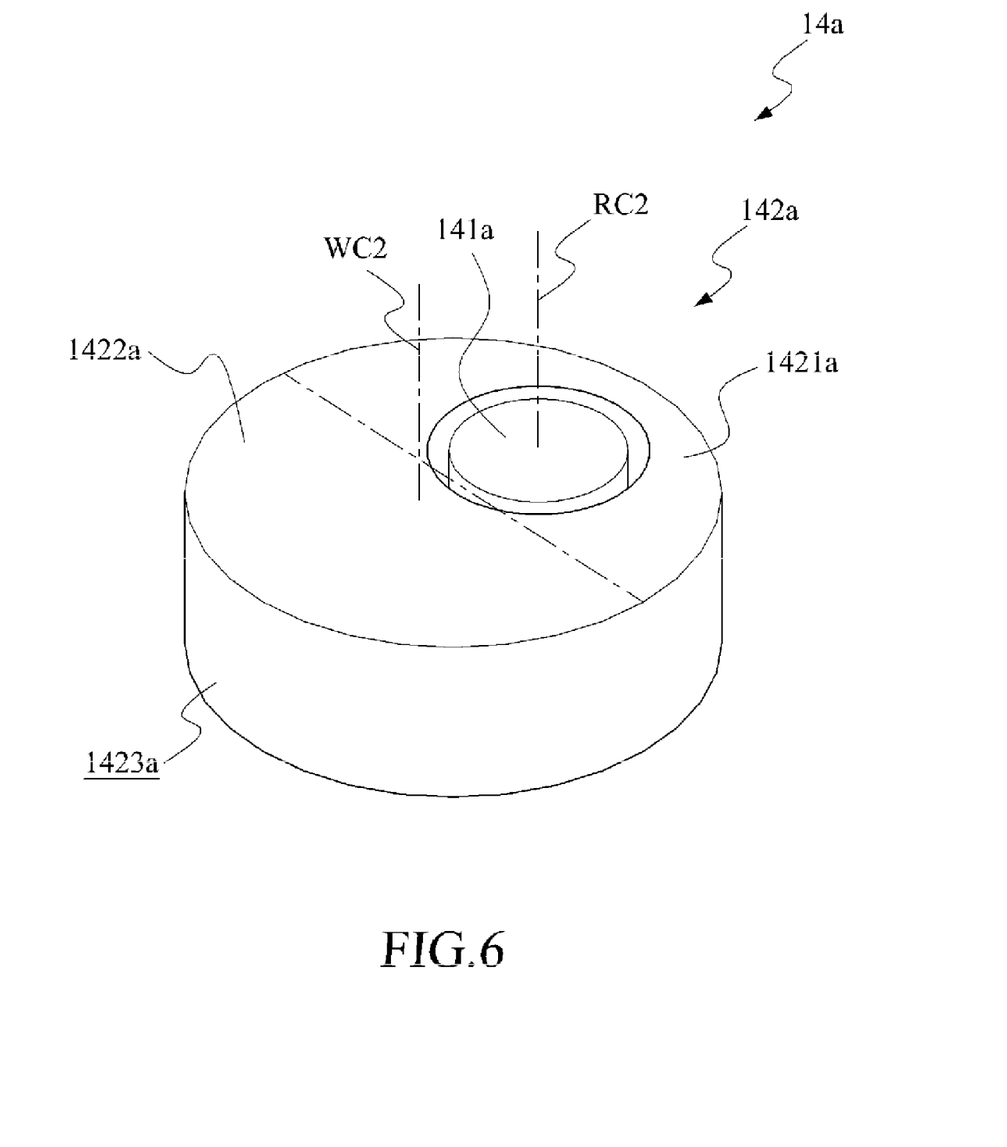
FIG. 6 illustrates the structure of the rotating type shading assembly in accordance with a second embodiment of the present invention.

Please refer to FIG. 6, which illustrates the structure of the rotating type shading assembly in accordance with a second embodiment of the present invention. In the second embodiment, another rotating type shading assembly 14a is applied to replace the rotating type shading assembly 14 as mentioned in the first embodiment. The rotating type shading assembly 14a includes a pivot 141a and a shading member 142a. The pivot 141a can be arranged in the shading chamber 112 (shown in FIG. 3), and can be a rotation center RC2. The shading member 142a includes a pivotal connection portion 1421a, a weight portion 1422a and a shading surface 1423a, and has a weight center WC2 offset from the rotation center RC2. In other words, the weight center WC2 is offset from the rotation center RC2. From FIG. 6, the shading member 142a is a substantial plate structure, and the pivotal connection portion 1421a and the weight portion 1422a can be roughly divided along the broken line shown in FIG. 6. The pivotal connection portion 1421a is pivotally connected to the pivot 141a. The weight portion 1422a is extended from the pivotal connection portion 1421a, the weight center WC2 is located in the weight portion 1422a, and the shading surface 1423a is also located in the weight portion 1422a.

Figure 7:
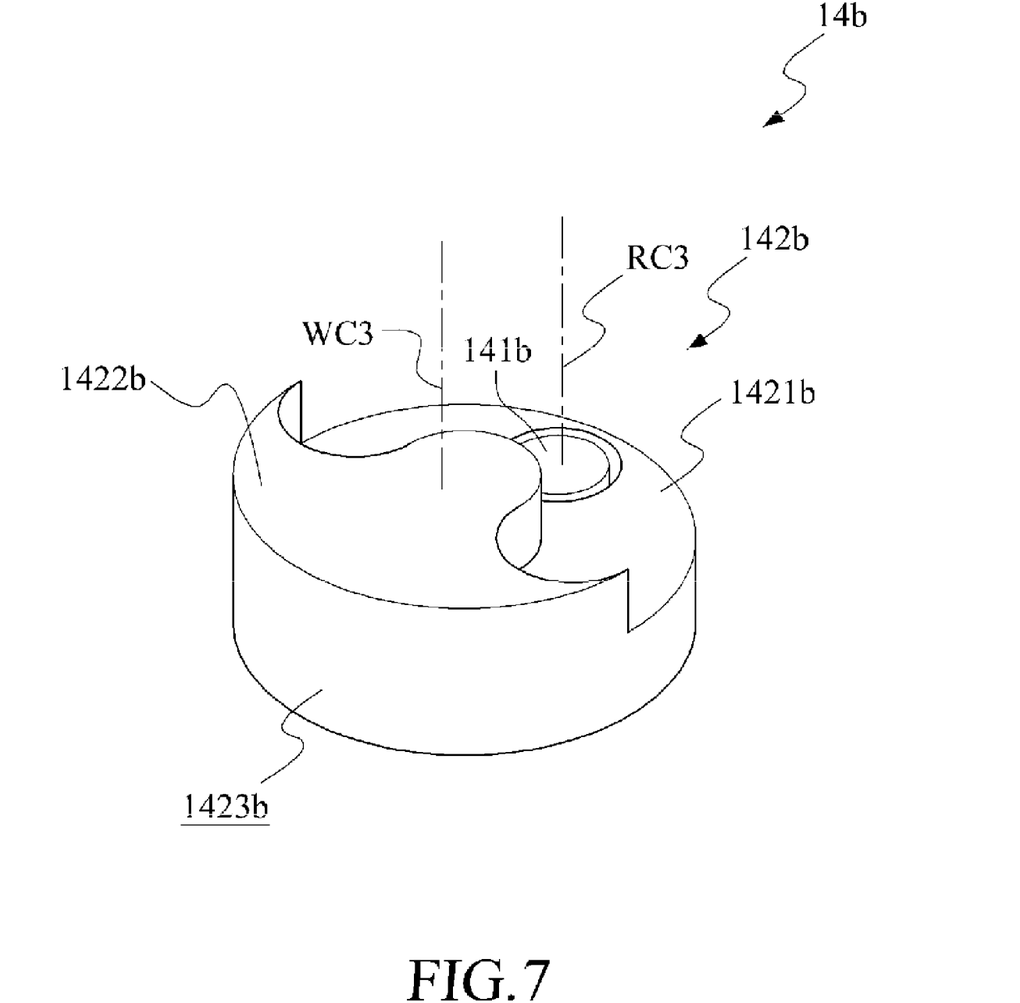
FIG. 7 illustrates the structure of the rotating type shading assembly in accordance with a third embodiment of the present invention.

Please refer to FIG. 7, which illustrates the structure of the rotating type shading assembly in accordance with a third embodiment of the present invention. In the third embodiment, another rotating type shading assembly 14b is applied to replace the rotating type shading assembly 14 as mentioned in the first embodiment. The rotating type shading assembly 14b includes a pivot 141b and a shading member 142b. The pivot 141b can be arranged in the shading chamber 112 (shown in FIG. 3), and can be a rotation center RC3. The shading member 142b includes a pivotal connection portion 1421b, a weight portion 1422b and a shading surface 1423b, and has a weight center WC3 offset from the rotation center RC3. In other words, the weight center WC3 is offset from the rotation center RC3. The weight, the specific weight, and/or the volume of the weight portion 1422b are/is greater than those/that of the pivotal connection portion 1421b. The pivotal connection portion 1421b is pivotally connected to the pivot 141b. The weight portion 1422b is extended from the pivotal connection portion 1421b, the weight center WC3 is located in the weight portion 1422b, and the shading surface 1423b is also located in the weight portion 1422b.

After reading the technology as disclosed in the present invention, it is further believable that any person skilled in the art can further recognize that taking the first embodiment for example, in the optical sensing device 1, a rotating type shading assembly 14 is applied to replace the conventional movable type shading member; therefore, it is able to sense the inclination azimuth of the optical sensing device via the rotation of the rotating type shading assembly 14, so as to reduce the generation of the noise caused by that the shading member impacts the inner wall of the shading chamber, and further to prevent from the troubles in use or maintenance caused by the noise.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An optical sensing device, comprising:
   a circuit board;
   a shell assembled with the circuit board to form a blackbody condition space having a light emitting chamber, at least one optical sensing chamber, and a shading chamber spatially communicated with the light emitting chamber and the optical sensing chamber;
   at least one light emitting member arranged in the light emitting chamber for projecting a light beam into the light emitting chamber;
   a rotating type shading assembly comprising:
      a pivot arranged in the shading chamber; and
      a shading member pivotally connected to the pivot, having a weight center offset from the pivot, and rotatably restrained in the shading chamber; and
   at least one optical sensing member arranged in optical sensing chamber to sense the light beam and accordingly send out a sensing signal.

2. The optical sensing device as claimed in claim 1, further comprising an anti-static member arranged in the shading chamber to ground a static electricity generated when the shading member rotates in the shading chamber.

3. The optical sensing device as claimed in claim 1, wherein the pivot is connected to the shell.

4. The optical sensing device as claimed in claim 1, wherein the pivot is connected to the circuit board.

5. The optical sensing device as claimed in claim 1, wherein the shading member further comprises:
   a pivotal connection portion; and
   a weight portion extended from the pivotal connection portion;
   wherein the weight center is located in the weight portion.

6. The optical sensing device as claimed in claim 5, wherein the specific weight of the weight portion is greater than the specific weight of the pivotal connection portion.

7. The optical sensing device as claimed in claim 5, wherein the volume of the weight portion is greater than the volume of the pivotal connection portion.

* * * * *